United States Patent [19]

Van Allman et al.

[11] Patent Number: 4,979,858
[45] Date of Patent: Dec. 25, 1990

[54] GUIDANCE DEVICE

[75] Inventors: Don T. Van Allman, Palatine; Harish C. Gupta, Downers Grove, both of Ill.

[73] Assignee: Illinois Tool Works, Inc., Glenview, Ill.

[21] Appl. No.: 358,107

[22] Filed: May 30, 1989

[51] Int. Cl.$^5$ ............................................. F16B 15/00
[52] U.S. Cl. .................................. 411/441; 411/394; 411/397
[58] Field of Search ............... 411/371, 373, 394, 429, 411/439, 440, 441, 493, 498, 596, 397

[56] References Cited

U.S. PATENT DOCUMENTS

| | | | |
|---|---|---|---|
| 2,676,508 | 4/1954 | Erickson | 411/441 |
| 3,978,759 | 9/1976 | Bakoledis | 411/441 |
| 4,286,496 | 9/1981 | Harris | 411/441 |
| 4,669,169 | 6/1987 | Hogg | 411/441 X |

FOREIGN PATENT DOCUMENTS

| | | | |
|---|---|---|---|
| 152760 | 12/1955 | Sweden | 411/441 |
| 737968 | 10/1955 | United Kingdom | 411/441 |

*Primary Examiner*—Gary L. Smith
*Assistant Examiner*—Jerry Redman
*Attorney, Agent, or Firm*—Schwartz & Weinrieb

[57] ABSTRACT

Improved guidance devices, particularly guidance flutes and guidance tips, as used to guide pointed fasteners, particularly drive pins of different lengths and threaded studs, as such fasteners are driven through muzzle bushings of powder-actuated tolls, are disclosed. Such a guidance flute, as extruded from an elastomeric material, has four pairs of non-radial ribs protruding outwardly from a tubular body. Each pair consists of one relatively short rib and one relatively long rib in parallel relation with respect to each other, upon opposite sides of a diametrical plane, when the ribs are unstressed. Such a guidance tip, as molded from an elastomeric material, has a cap portion and a flared skirt, which has plural slots extending toward the cap portion and dividing the skirt portion into plural flanged or flared portions. Such guidance devices, when assembled with such fasteners, can be snugly fitted within a muzzle bushing having a bore diameter within a range of bore diameters.

19 Claims, 8 Drawing Sheets

GUIDANCE DEVICE

TECHNICAL FIELD OF THE INVENTION

This invention pertains to guidance devices, such as, for example, guidance flutes and guidance tips, as used to guide pointed fasteners, such as, for example, drive pins and threaded studs, as such fasteners are driven by means of powder-actuated tools.

BACKGROUND OF THE INVENTION

Guidance devices are used in countless numbers in order to guide pointed fasteners, such as, for example, drive pins and threaded studs, as such fasteners are driven by means of powder-actuated tools. Typically, a drive pin has an elongate shank, which is formed with a pointed end, and a head, which when viewed axially is circular. The shank may be somewhat flared where the shank merges with the head.

Typically, a threaded stud has an unthreaded portion, which resembles the shank of a drive pin and which has a pointed end, and a threaded portion which extends axially from the unthreaded portion, resembles the threaded shank of a machine screw, and which has a blunt end. The blunt end, which is opposite to the pointed end, may be partially unthreaded.

Typically, a powder-actuated tool, as mentioned above, has a muzzle bushing, from which such a fastener is driven, and a driver, which when driven axially through the muzzle bushing impacts and drives the fastener. The muzzle bushing, which has a circular bore, may alternatively be known as a barrel extension. Typically, the circular bore of the muzzle bushings has a bore diameter ranging from approximately 0.300 inch (7.62 mm) to approximately 0.354 inch (9.00 mm) and a bore length exceeding 3.0 inch (7.62 cm). A commercial source for such powder-actuated tools is ITW Ramset-Red Head (a division of Illinois Tool Works Inc.) of Wood Dale, Illinois.

It is known to assemble a guidance device upon each fastener before the fastener is inserted into the muzzle bushing of such a tool. In many instances, the guidance device is used not only to guide the fastener but also to retain the fastener within the muzzle bushing before the fastener is driven, whereby the fastener is retained within the muzzle bushing even if the muzzle bushing is placed in a vertical orientation.

If such a fastener were to be forcibly driven into a workpiece, such as, for example, a piece of structural steel, or into a substrate, such as a substrate of concrete or masonry, at an angle deviating significantly from a right angle, the utility of the fastener would be significantly diminished. Moreover, the fastener could bend, or break. It is important, therefore, for such a fastener to be concentrically guided within the muzzle bushing of such a tool.

A guidance device of a known type constituting prior art vis-a-vis this invention and enjoying wide acceptance among contractors and other users, is disclosed in U.S. Pat. No. 4,286,496 issued to Harris. As disclosed therein, the guidance device is made from an elastomeric material, which has a hardness of 65 to 75 durometers on the Shore A scale. Such device has what is described therein as an axially elongate, hollow, cylindrical body portion, upon the outer surface of which are formed a plurality of flexible, axially elongate fins (or fin members) extending radially at regular circumferential intervals. Alternating ones of the fins (or fin members) are described therein as being of substantially greater radial extent than the adjacent ones. Such device is described therein as being useful in connection with a range of sizes of muzzle bushing bores. The shorter fins are described therein as acting to prevent the fastener point from being deflected off-center by more than half the difference between the bore diameter and the circumscribed diameter defined by means of the shorter fins.

The guidance device described as prior art in such Harris patent has a tubular body and three integral, radial ribs, of equal length when measured radially.

A guidance device such as the guidance device disclosed in such Harris patent may alternatively be known, in view of the fluted shape of such device, as a guidance flute, a term employed herein.

A guidance device of a different type constituting prior art vis-a-vis the present invention is used to protect the starting threads of a threaded stud and to guide the stud within a muzzle bushing as the stud is driven. Such a device fits snugly over the starting threads but allows the blunt end of the stud to remain exposed where such end is to be later impacted by means of the tool driver. Such a device alternatively be known, in view of its usage, as a guidance tip, a term employed herein.

It is known, moreover, to employ a guidance device of each of the aforesaid type on a threaded stud, namely, a guidance flute on the unthreaded portion of such stud and a guidance tip on the blunt end of such stud.

Herein, all references to driving a pointed fastener, such as, for example, a drive pin or a threaded stud, into masonry are meant to refer to driving such a fastener into a grout-filled concrete block or the like, not into a hollow concrete block, common brick, or the like.

Although guidance devices constituting prior art, as described above, have proved to be generally satisfactory, there has remained a need, to which this invention is addressed, for improved guidance devices enabling pointed fasteners, such as, for example, drive pins and threaded studs, to be concentrically guided within different muzzle bushings which may exhibit a range of muzzle bushing diameters. The need has embraced both guidance flutes and guidance tips.

SUMMARY OF THE INVENTION

This invention provides improved guidance devices, as discussed above, which are used to guidance pointed fasteners within muzzle bushings of powder-actuated tools.

Thus, this invention provides an improved guidance flute, as used to retain a pointed fastener, such as, for example, a drive pin or a threaded stud, within a muzzle bushing of a powder-actuated tool and to guide the fastener within the muzzle bushing as the fastener is driven by means of the tool.

Also, this invention provides an improved guidance tip, as used with a threaded stud having an unthreaded portion which is formed with appointed end, and a threaded portion which extends axially from the unthreaded portion, has starting threads, among other threads, and a blunt end. The guidance tip is used to protect the starting threads and to guide the threaded stud within a muzzle bushing of a powder-actuated tool as the threaded stud is driven by means of the tool.

A guidance flute according to this invention and a pointed fastener, such as, for example, a drive pin or a threaded stud, may be advantageously assembled. A guidance tip according to this invention and a threaded stud may be advantageously assembled, preferably with a guidance flute according to this invention.

Broadly, a guidance flute according to this invention is made of an elastomeric material, such as, for example, poly(vinyl chloride), and has a tubular body. The tubular body is formed with a central bore defining a central axis of the guidance flute and extending through the tubular body. The tubular body is formed with integral ribs projecting outwardly but not radially from the tubular body and extending axially along the tubular body, namely relatively short ribs and relatively long ribs, as measured in an outwardly projecting sense.

The ribs of the guidance flute are arrayed in at least three pairs. Each pair consists of one relatively short rib and one relatively long rib in parallel relation with respect to each other. The relatively long rib of each pair is to one side of an imaginary diametrical plane through the central axis of the guidance flute when all ribs of the guidance flute are unstressed. Such pairs are arrayed at regular circumferential intervals about the tubular body. The relatively long ribs are arranged to be elastically deformed so as to fit snugly within a muzzle bushing having a bore diameter which is within arrange of bore diameters smaller than the diameter of an imaginary circular cylinder circumscribing the relatively long ribs when the relatively long ribs are unstressed but not smaller than the diameter of an imaginary circular cylinder circumscribing the relatively short ribs when the relatively short ribs are unstressed.

Preferably, the relatively short and relatively long ribs of each pair are spaced equally from an imaginary diametrical plane through the central axis of the guidance flute when all ribs of the guidance flute are unstressed. Preferably, the relatively short rib of each pair and the relatively long rib of a diametrically opposed one of such pairs are disposed on a common side of such a diametrical plane. Preferably, the relatively short and relatively long ribs are arranged in four pairs, each pair consisting of one relatively short rib and one relatively long rib in parallel relation with respect to each other, upon opposite sides of such a diametrical plane, and in parallel relation with respect to the relatively short and relatively long ribs of a diametrically opposed one of such pairs, when all ribs of the guidance flute are unstressed. Consequently, the relatively long ribs of the respective pairs in diametrically opposed relation with respect to each other are adapted to bear against an inner cylindrical wall of such a muzzle bushing at diametrically opposed locations upon such wall.

When an assemblage is made from a guidance flute according to this invention and a drive pin having an elongate shank, which has a pointed end, the elongate shank is fitted snugly within the central bore of the tubular body of the guidance flute with some elastic deformation of the tubular body occurring along the central bore thereof. Typically, as mentioned above, the drive pin has a head, which when viewed axially is circular. Preferably, the head has a diameter which is approximately equal to the diameter of an imaginary circular cylinder circumscribing the relatively short ribs when the relatively short ribs are unstressed.

Broadly, a guidance tip according to this invention is made of an elastomeric material, such as, for example, polyethylene, defines a central axis, and has a cap portion and a skirt portion. The cap portion is arranged to fit snugly over the blunt end of such a threaded stud.

The skirt portion, which extends axially from the cap portion, is adapted to be elastically deformed so as to fit snugly within such a muzzle bushing having a bore diameter which is within a range of bore diameters smaller than the diameter of a circular cylinder circumscribing the skirt portion when the skirt portion is unstressed.

Preferably, the skirt portion is flared and has a plurality of slots dividing the skirt portion so as to enable the skirt portion, to be elastically deformed so as to fit snugly within such a muzzle bushing having a bore which is within the range noted in the preceding paragraph. Preferably, such slots extend toward the cap portion so as to divide the skirt portion into a plurality of flanged portions.

When an assemblage is made from a guidance flute according to this invention and a threaded stud having an unthreaded portion, which is formed with a pointed end, and a threaded portion, which extends axially from the unthreaded portion, and which has a larger diameter compared to the diameter of the unthreaded portion, the unthreaded portion is fitted snugly within the central bore of the tubular body of the guidance flute with some elastic deformation of the tubular body occurring along the central bore thereof.

Broadly, a guidance tip according to this invention is made of elastomeric material, such as, for example, polyethylene, and has a cap portion and a skirt portion. The cap portion, which has a tubular wall with an outer diameter, is arranged to fit snugly over the blunt end of the threaded portion of a threaded stud. The cap portion may allow the blunt end to remain exposed where such end is to be subsequently impacted. The skirt portion, which extends axially from the cap portion, is slotted so as to enable the skirt portion to be elastically deformed so as to fit snugly, within a muzzle bushing having a bore diameter which is within a range of bore diameters smaller than the diameter of an imaginary circular cylinder circumscribing the skirt portion when the skirt portion is unstressed but larger than the outer diameter of the tubular wall of the cap portion. Preferably, the skirt portion is flared and has a plurality of slots dividing the skirt portion so as to enable the skirt portion to be resiliently or elastically deformed. Preferably, such slots extend toward the cap portion so as to divide the skirt portion into a plurality of flanged portions, which are adapted to be elastically deformed so as to fit snuggly within a muzzle bushing having a bore diameter within the noted range. Preferably, the skirt portion has three such slots, which are arranged at regular circumferential intervals about the skirt portion.

When an assemblage is made from a guidance tip according to this invention and a threaded stud, the cap portion of the guidance tip is fitted snugly, onto the blunt end of the threaded portion, sometimes in such a manner as to allow the blunt end to remain exposed where the blunt end is to be subsequently impacted. The tubular wall of the cap portion and the skirt portion protect the starting threads of the threaded portion of the threaded stud. Preferably, a guidance flute according to this invention is included in the assemblage, as mentioned above. Preferably, if a guidance flute according to this invention is included in the assemblage, the diameter of an imaginary circular cylinder circumscribing the skirt portion of the guidance tip is approximately equal to the diameter of an imaginary circular cylinder circumscribing the relatively long ribs of the guidance flute when the relatively long ribs are unstressed.

Guidance devices according to this invention, namely guidance flutes according to this invention and guidance tips according to this invention, can be effectively used to guide pointed fasteners, such as, for example, drive pins and threaded studs, concentrically through muzzle bushings as such fasteners are driven by means of powder-actuated tools.

BRIEF DESCRIPTION OF THE DRAWINGS

These and other objects, features, and advantages of this invention will be evident from the following description of preferred embodiments of this invention, with reference to the accompanying drawings wherein like reference characters designate like or corresponding parts throughout the several views, and wherein:

FIGS. 8, 9, and 10 are fragmentary views taken partly in cross section through a central axis of the muzzle bushing of FIG. 1, FIGS. 8 and 9 showing successive stages as the drive pin of FIG. 1, as fitted within the guidance flute of FIG. 1 is driven through a thin metal plate, into a thick metal plate, by means of a driver which is driven axially through the muzzle bushing, as shown in FIGS. 8 and 9, the guidance flute, as shown in FIG. 8, being partly broken away, while FIG. 10 shows the drive pin, as driven.

FIG. 13 is a cross-sectional view through the guidance tip of FIG. 12, on an enlarged scale compared to FIG. 12, as taken along line 13—13 of FIG. 12 in the direction indicated by means of the arrows, while

FIG. 5 is a perspective view of an assemblage made from the threaded stud, the guidance tip, and the guidance flute each as shown in FIG. 12, on a similar scale compared to that of FIG. 12.

DETAILED DESCRIPTION OF THE ILLUSTRATED EMBODIMENTS

Figure 12:
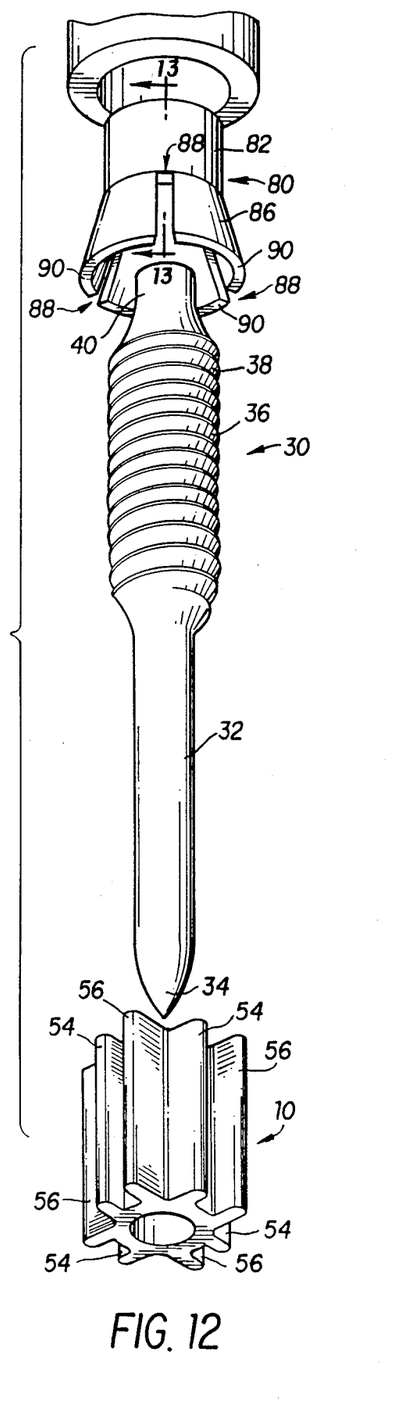
FIG. 12 is an exploded, perspective view showing a threaded stud being fitted with a guidance tip according to this invention, and also with a guidance flute according to this invention, before the threaded stud, the guidance tip, and the guidance flute, as an assemblage, are inserted into a muzzle bushing of a powder-actuated tool, the muzzle bushing being shown fragmentarily.
Figure 13:
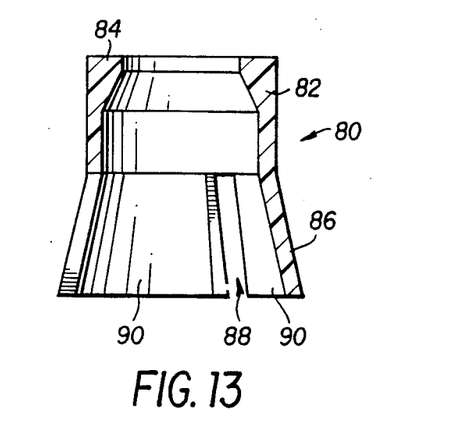
Figure 14:
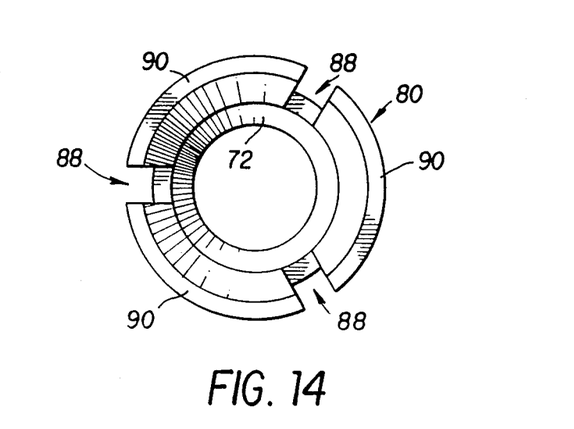
FIG. 14 is an end view of the guidance tip of FIG. 12, on a similarly enlarged scale, as taken from its bottom end.
Figure 15:
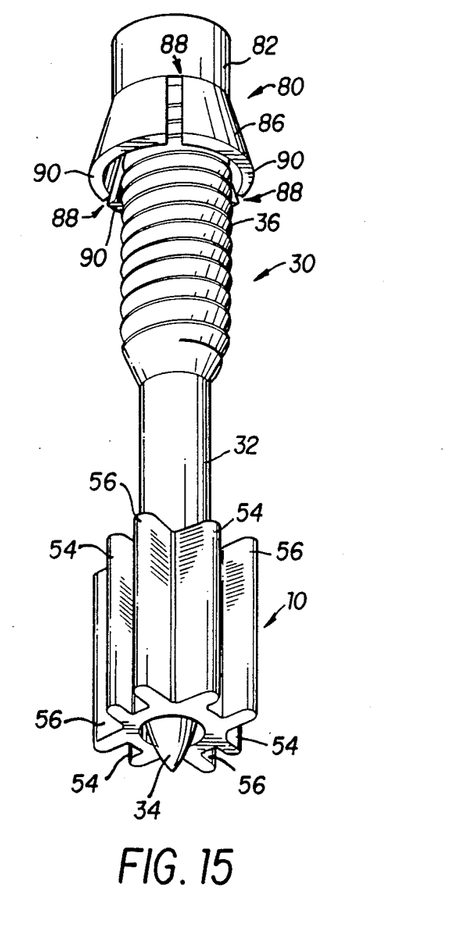
Figure 17:
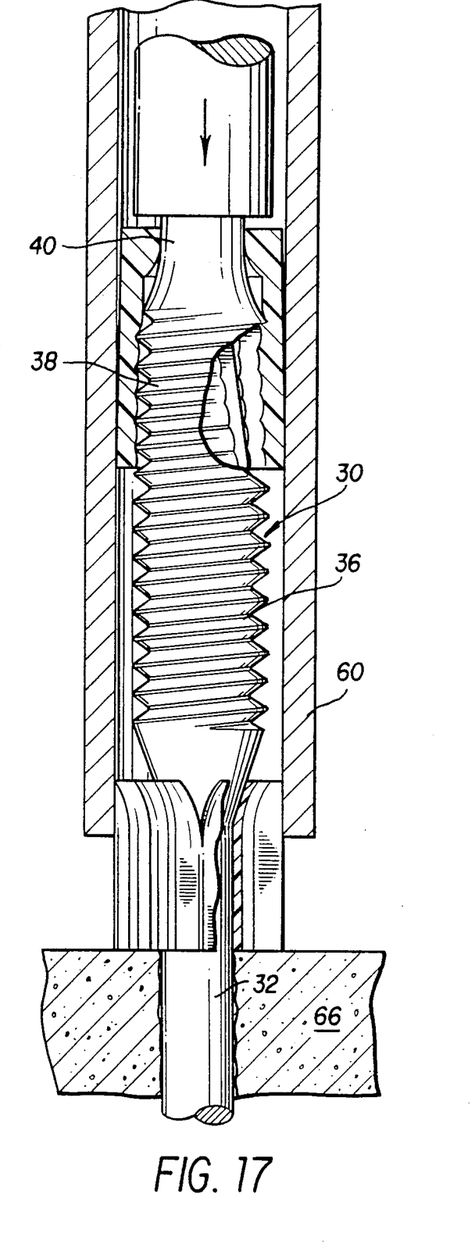
FIG. 17 is a fragmentary view, on an enlarged scale compared to those of FIGS. 15 and 16, showing the threaded stud of the assemblage of FIG. 15 being driven from the muzzle bushing, into a substrate of concrete, a driver which is driven axially through the muzzle bushing, being shown in FIG. 17.

As shown in FIGS. 1 through 9, and also in FIGS. 12, 15, and 17, a guidance device 10 constitutes a preferred embodiment of this invention, as embodied in a guidance flute.

Figure 1:
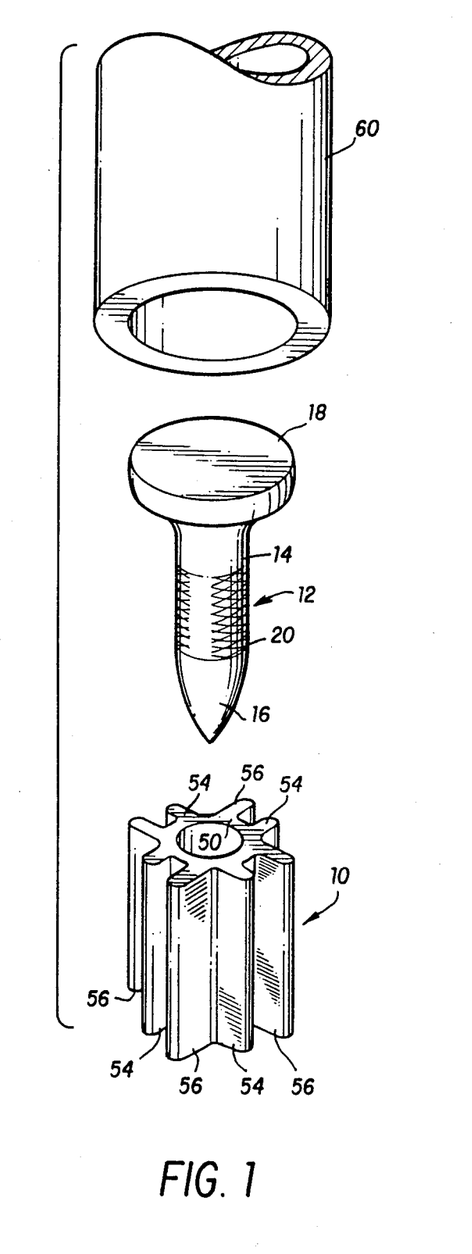
FIG. 1 is an exploded, perspective view showing a drive pin being fitted with a guidance flute according to this invention before the drive pin and the guidance flute are inserted, as an assemblage, into a muzzle bushing of a powder-actuated tool, the muzzle bushing being shown fragmentarily.
Figure 2:
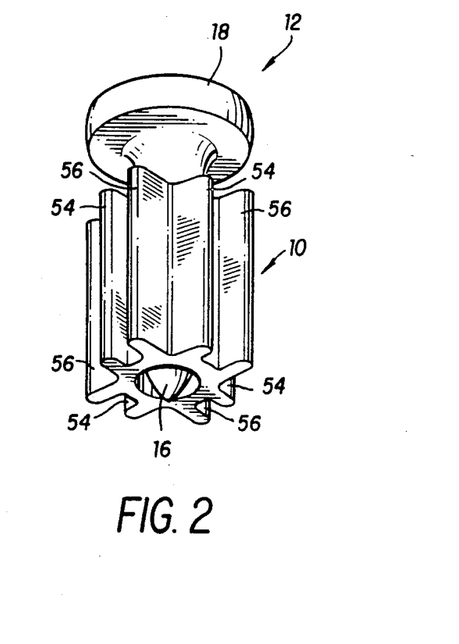
FIG. 2 is a perspective view of an assemblage made from the drive pin of FIG. 1 and the guidance flute.

As shown in FIGS. 1 and 2, among other views, the guidance flute 10 is associated with a drive pin 12 having an elongate, relatively short shank 14, which is formed with a pointed end 16, and a head 18, which when viewed axially is circular. As shown in FIG. 2, the shank 14 is flared where the shank 14 merges with the head 18. As shown in FIG. 1, the shank 14 has a knurled portion 20, which is formed upon a region of the shank 14 between the pointed end 16 and the head 18.

Figure 7:
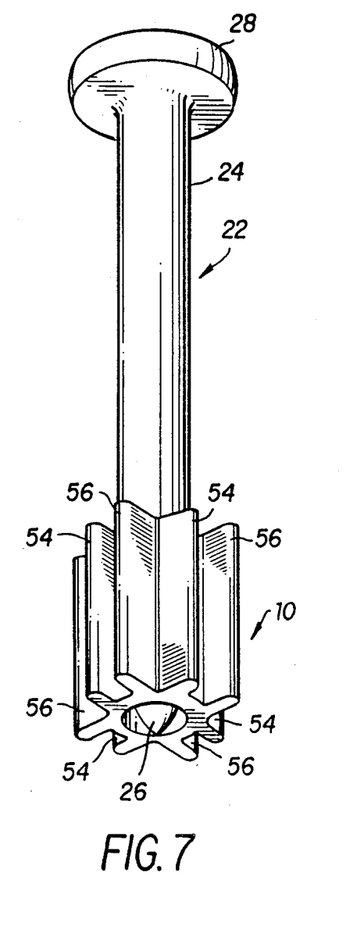
FIG. 7 is a perspective view of an assemblage made from a drive pin having a longer shank, as compared to the shank of the drive pin, of the assemblage of FIG. 2, and, the guidance flute, the assemblage of FIG. 7 is being capable of being substitutabled for the assemblage of FIG. 2 within the muzzle bushings of FIGS. 4, 5, and 6, respectively.

As shown in FIG. 7, the guidance flute 10 is associated with a drive pin 22 having an elongate, relatively long shank 24, which is formed with a pointed end 26, and a head 28, which when viewed axially is circular. The shank 24 may have a knurled portion (not shown) similar to the knurled portion 20 of the shank 14 of the drive pin 12. The drive pin 22 and the drive pin 12 are alike except for their shanks.

As shown in FIGS. 12, 15, and 17, the guidance flute 10 may be associated with a threaded stud 30 having an unthreaded portion 32, which is formed with a pointed end 34, and a threaded portion 36, which extends axially from the unthreaded portion 32, and which is formed with starting threads 38, among other threads, and with an unthreaded, blunt end 40. The diameter of an imaginary circular cylinder circumscribing the threaded portion 36, except for the blunt end 40, is larger than the diameter of the unthreaded portion 32 and larger than the diameter of the blunt end 40.

The guidance flute 10 is severed from an extruded rope (not shown) of elastomeric material. Poly(vinyl chloride) having a hardness of approximately 85 durometers on the Shore A scale is a preferred material for the guidance flute 10.

The guidance flute 10 has a tubular body 50 with a central bore 52 defining a central axis of the guidance flute 10 and extending axially through the tubular body 50. The tubular body 50 is formed with integral ribs projecting outwardly, but not radially, from the tubular body 50 and extending axially along the tubular body 50, between opposite ends of the tubular body 50, namely relatively short ribs 54 and relatively long ribs 56, as measured in a sense of outward projection from the tubular body 50.

Figure 3:
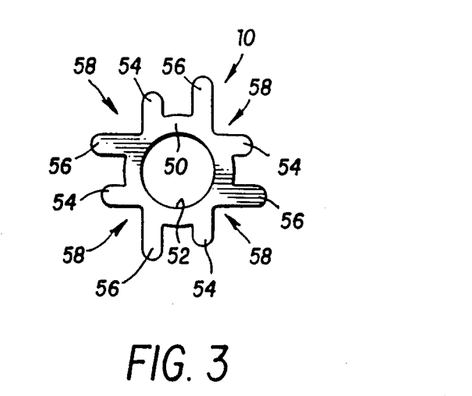
FIG. 3 is an end view of the guidance flute apart from the drive pin of FIG. 1.

Moreover, along its distal edge, each rib of the guidance flute 10 is rounded in cross section, as may be best seen in FIG. 3, so as to be approximately semi-cylindrical along its distal edge. Furthermore, a generally V-shaped valley 58 is formed between circumferentially adjacent pairs of the ribs of the guidance flute 10, that is, between the relatively short rib 54 of a particular pair and the relatively long rib 56 of the pair adjacent to such particular pairs in a circumferential sense.

As shown in FIGS. 1 and 2, as assemblage can be readily made from the guidance flute 10 and the drive pin 12, and the assemblage made therefrom can be readily inserted into a muzzle bushing of a powder-actuated tool, as exemplified by means of a muzzle bushing 60. The shank 14 of the drive pin 12 is fitted snugly within the central bore 52 of the tubular body 50 of the guidance flute 10. Thus, some elastic deformation of the tubular body 50 occurs along the central bore 52 thereof. Such deformation retains the shank 14 within the central bore 52. The head 18 of the drive pin 12 has a diameter substantially equal to but not greater than the diameter of an imaginary circular cylinder circumscribing the relatively short ribs 54 when the relatively short ribs 54 are unstressed.

The ribs of the guidance flute 10 are arranged in four pairs. Each pair consists of one relatively short rib 54, and one relatively long rib 56 in parallel relation with respect to each other, on opposite sides of an imaginary diametrical plane through the central axis of the guidance flute 10, and in parallel relation to the relatively short rib 54 and the relatively long rib 56 of a diametrically opposed one of such pairs, when all ribs of the guidance flute 10 are unstressed. In each pair, moreover, the relatively short rib 54 and the relatively long rib 56 are spaced equally from such a diametrical plane when all ribs of the guidance flute 10 are unstressed.

Consequently, as may be best seen in FIG. 3, each of the relatively short and relatively long ribs of the guidance flute 10 is non-radial, pointing outwardly from the tubular body 50 so that any imaginary plane through any given rib of the guidance flute 10, in parallel relation to the given rib when the given rib is unstressed, is tangent to an imaginary circular cylinder concentric with the central axis of the tubular body 50.

The assemblage, as formed from the guidance flute 10 and the drive pin 12, is shown in FIG. 2. The assemblage shown in FIG. 2 is inserted into the muzzle bushing 60 so that the pointed end 16 of the drive pin 12 points outwardly from a position within the muzzle bushing 60.

As shown in FIG. 7, an assemblage can be similarly made from the guidance flute 10 and the drive pin 22. The shank 24 of the drive pin 22 is fitted snugly within the central bore 52 of the tubular body 50 of the guidance flute 10. Thus, some elastic deformation of the tubular body 50 occurs along the central bore 52 thereof. Such deformation retains the shank 14 within the central bore 52. The guidance flute 10 is advanced, along the shank 24, until the pointed end 26 of the drive pin 22 emerges from the central bore 52. Optionally, the guidance flute 10 may be further advanced, away from the pointed end 26. Preferably, however, the guidance flute 10 is disposed closer to the pointed end 26 and farther from the head 28 of the drive pin 22. The head 28 has a diameter which is nearly equal to but not greater than the diameter of an imaginary circular cylinder circumscribing the relatively short ribs 54 when the relatively short ribs 54 are unstressed. If the guidance flute 10 is disposed near the pointed end 26 of the drive pin 22, the head 28 can thus be used to limit wobble of the drive, pin 22 within a muzzle bushing as exemplified by means of the muzzle bushing 60.

The assemblage formed from the guidance flute 10 and the drive pin 22, as shown in FIG. 7, is inserted into a muzzle bushing, as exemplified by means on the muzzle bushing 60, so that the pointed end 26 of the drive pin 22 points outwardly from a position within the muzzle bushing. Typically, in a powder-actuated tool, the muzzle bushing has sufficient length to accommodate such a drive pin having a relatively long shank.

As shown in FIGS. 12 and 15, an assemblage can be readily made from the guidance flute 10, the threaded stud 32, and a guidance tip 80 to be later described. The unthreaded portion 32 of the threaded stud 30 is fitted snugly within the central bore 52 of the tubular body 50. Thus, some elastic deformation of, the, tubular body 50 occurs along the central bore 52 thereof. Such deformation retains the unthreaded portion 32 within the central bore 52. The guidance flute 10 is advanced, along the unthreaded portion 32, until the pointed end 34 of the unthreaded portion 32 emerges from the central bore 52. Optionally, the guidance flute 10 may be further advanced, away from the pointed end 34, until the guidance flute 10 reaches the threaded portion 36 of the threaded stud 30. The threaded portion 36, which has a larger diameter than that of the unthreaded portion 32 cannot be easily fitted within the central bore 52 without causing the tubular body 50 to split prematurely.

The relatively long ribs 56 of the guidance flute 10 are adapted to be elastically deformed so as to fit snugly within a muzzle bushing, as exemplified by means of the muzzle bushing 60, if the muzzle bushing has a bore diameter within a range of bore diameters smaller than the diameter of an imaginary circular cylinder circumscribing the relatively long ribs 56 when the relatively long ribs 56 are unstressed but not smaller than the diameter of an imaginary circular cylinder circumscribing the relatively short ribs 54 when the relatively short ribs 54 are unstressed.

Figure 4:
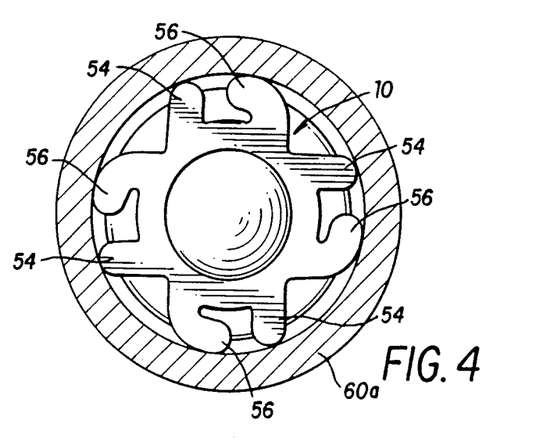
FIGS. 4, 5, and 6 are cross-sectional views taken through three muzzle bushings with different bore diameters, after the assemblage of FIG. 2 has been inserted.
Figure 5:
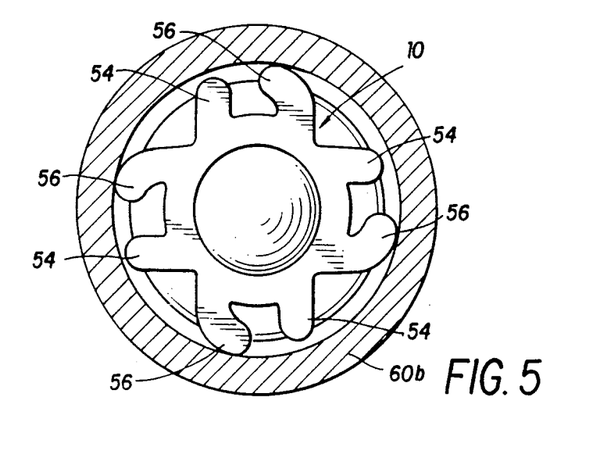
Figure 6:
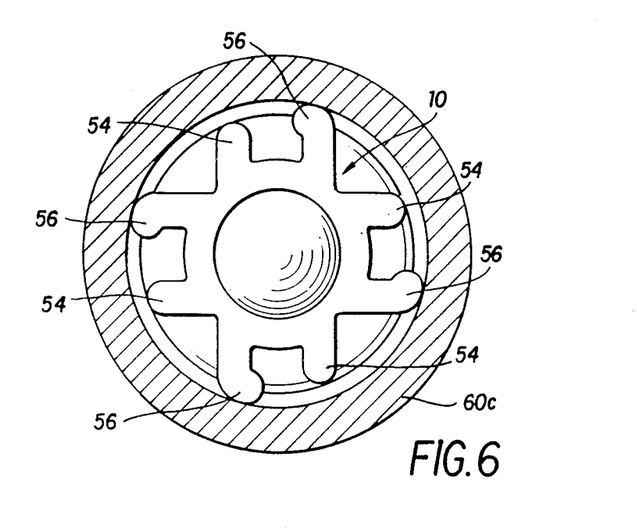

In FIGS. 4, 5, and 6, an assemblage including the guidance flute 10, and exemplifying both the assemblage shown in FIG. 2 and the assemblage shown in FIG. 7, is shown as fitting snugly within muzzle bushings 60a, 60b and 60c, respectively. The muzzle bushing 60a shown in FIG. 4 has a bore diameter approximating the smallest diameter of the range set forth in the preceding paragraph. The muzzle bushing 60b shown in FIG. 5 has a bore diameter exemplifying an intermediate diameter of the same range. The muzzle bushing 60c shown in FIG. 6 has a bore diameter approximating the largest diameter of the same range. A muzzle bushing having a bore diameter that would be much smaller than the bore diameter of the muzzle bushing 60a shown in FIG. 4 would stress the relatively long ribs 56 of the guidance flute 10 excessively. A muzzle bushing having a bore diameter that would be much larger than the bore diameter of the muzzle bushing 60c shown in FIG. 6 would stress the relatively long ribs 56 insufficiently or would fail to stress the relatively long ribs 56 at all.

When stressed sufficiently, within a muzzle bushing, as exemplified by means of the muzzle bushing 60, the relatively long ribs 56 of the guidance flute 10 provide sufficient friction between the guidance flute 10 and the muzzle bushing so as to retain the guidance flute 10 along with a pointed fastener assembled with the guidance flute 10, within the muzzle bushing, at any orientation of the muzzle bushing, even at a vertical orientation causing the pointed end of the pointed fastener to point downwardly.

When stressed within a muzzle bushing, as exemplified by means of the muzzle bushing 60, the relatively long ribs 56 of the guidance flute 10 bend in a common circumferential direction, as shown in FIGS. 4, 5, and 6, whereby the relatively long ribs 56 tend to guide the guidance flute 10, along with a pointed fastener assembled with the guidance flute 10, concentrically within the muzzle bushing as the pointed fastener is driven through the muzzle bushing.

When stressed more than minimally within a muzzle bushing, the relatively short ribs 54 of the guidance flute 10 tend to bend in an opposite circumferential direction, whereby the distal ends of the relatively short and relatively long ribs of each pair tend to approach each other, and even tend to engage each other in an extreme case, so as to oppose any further tendencies of the guidance flute 10 to become eccentric within the muzzle bushing.

Figure 8:
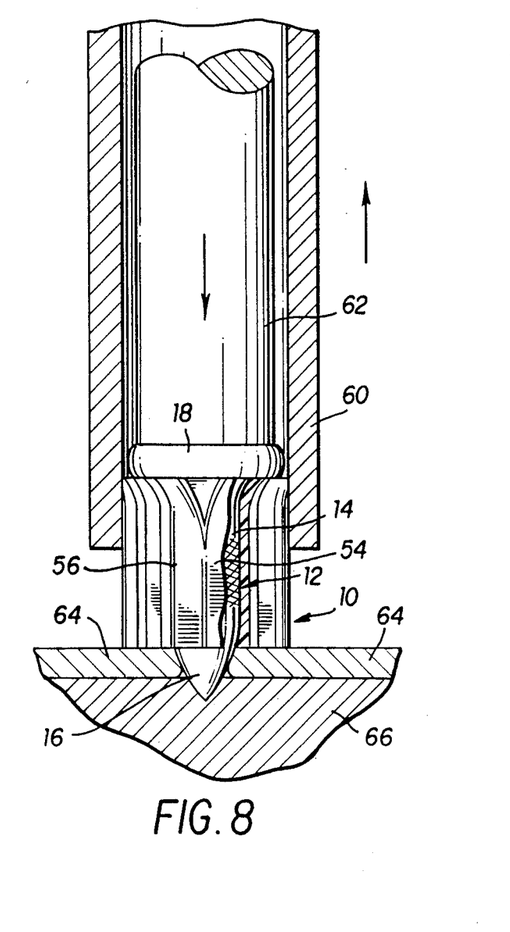
Figure 9:
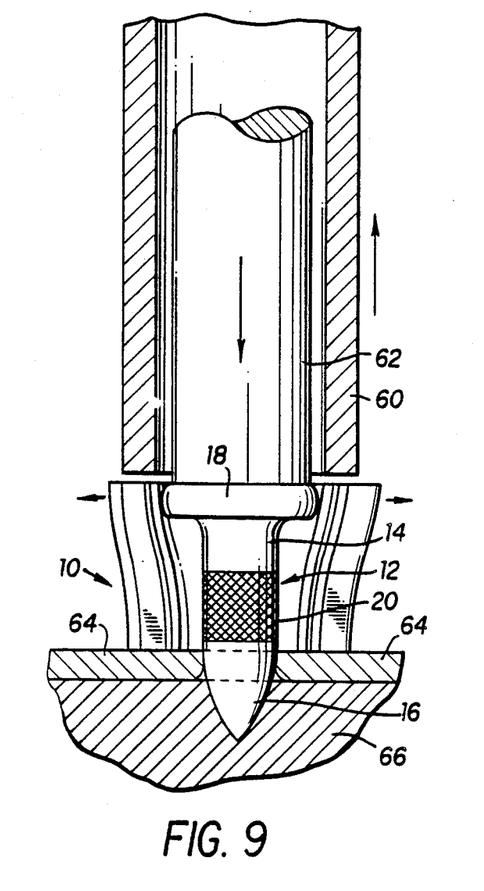
Figure 10:
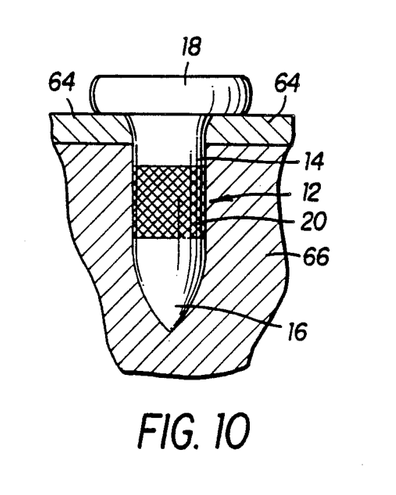

As shown of FIGS. 8 and 9, the drive pin 12 in the assemblage shown in FIG. 2 is being driven from the muzzle bushing 60, by means of a driver 62 of the powder-actuated tool including the muzzle bushing 60, through a thin metal plate 64, and into a thick metal plate 66. The drive pin 22 in the assemblage shown in FIG. 7 can be similarly driven into such a thick metal plate, or into a substrate of concrete, or of masonry. As shown in FIGS. 8 and 9, the pointed end 16 of the drive pin 12 pierces the thin metal plate 64 and penetrates the thick metal plate 66, as the drive pin 12 is driven. As the guidance flute 10 is driven by means of the head 18 of the drive pin 12 against the metal plate 64, the flared upper end of the shank 14 of the drive pin 12 begins to split the guidance flute 10 axially, usually along one or more of the generally V-shaped valleys 58. The guidance flute 10 may split additionally, or alternatively, between the relatively long and relatively short ribs of one or more of the aforesaid pairs. Once the guidance flute 10 begins to split axially, the guidance flute 10 spreads circumferentially as the guidance flute 10 emerges from the muzzle bushing 60 so that the guidance flute 10 cannot be accidentally drawn back into the muzzle bushing 60 when the driver 62 is retracted. Although there may not be sufficient clearance initially, the powder-actuated tool including the muzzle bushing 60 tends to recoil so as to provide sufficient clearance for the guidance flute 10 to emerge from the muzzle bushing 60 and for the guidance flute 10 to spread radially.

Desirably, the elastomeric material of the guidance flute 10 has sufficient hardness and is sufficiently thin in cross section, at the generally V-shaped valley regions 58, so as enable the guidance flute 10 to split axially, as mentioned above, rather than stretch, allow the pointed fastener to pass through the central bore 52, and recover elastically without splitting axially.

The threaded stud 30 in the assemblage shown in FIG. 15 can be similarly driven from a muzzle bushing, as exemplified by the muzzle bushing 60. The guidance cap 80, which is mentioned above as included in the assemblage shown in FIG. 15, serves to protect the starting threads 38 of the threaded portion 36 of the threaded stud 30 and, along with the guidance flute 10, additionally serves to guide the threaded stud 30 as the threaded stud 30 is driven through the muzzle bushing.

Figure 11:
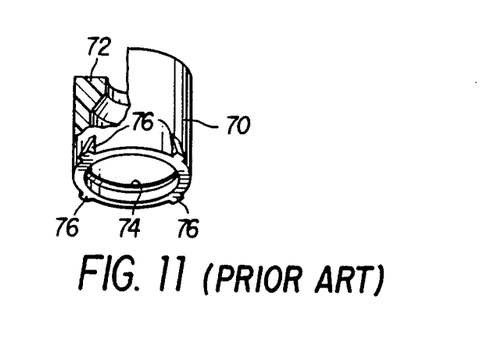
FIG. 11 is a partly broken away, perspective view of a guidance tip constituting prior art.

A guidance tip 70 exemplifying the prior art is shown in FIG. 11. The guidance tip 70 is molded from an elastomeric material and is tubular, except for a thick inner, annular rim 72 at its upper end, a thin, annular bead 74 about its inner, cylindrical wall, and four radial nubs 76 of triangular profiles, at its lower end. The guidance tip 70 fits snugly around the blunt end of the threaded portion of a threaded stud, so as to protect the starting threads of the threaded stud, and so as to expose the blunt end where the blunt end is to be subsequently impacted when the threaded stud is driven. The annular bead 74 fits snugly around the threaded portion. The radial nubs 76 are compressible in a radial sense so as to guide the guidance tip, along with a threaded stud assembled with the guidance tip, as the threaded stud is driven through a muzzle bushing with a bore diameter within a narrow range of bore diameters.

As shown in FIGS. 12 through 17, the guidance tip 80 according to this invention is molded from an elastomeric material, preferably polyethylene, and has a cap portion 82, which is tubular, except for a thick, annular rim 84 at its upper end, and a skirt portion 86, which is flared when unstressed. The cap portion 82 is adapted to be snugly fitted around the blunt end 40 of the threaded stud 30, so as to expose the blunt end 40 where the blunt end 40 is to be subsequently impacted when the threaded stud 30 is driven. When the cap portion 82 is thus fitted around the blunt end 40, the skirt portion 86 surrounds the starting threads 38 of the threaded stud but does not engage the starting threads 38 when the skirt portion 86 is unstressed.

The skirt portion 86 of the guidance tip 80 is divided by means of three wide slots 88, which extend from the bottom edge of the guidance tip 80 toward the cap portion 82, and which are arrayed at regular circumferential intervals about the skirt portion 86. Such slots 88 divide the skirt portion 86 into three flange portions 90, which are adapted to be elastically deformed so as to fit snugly within a muzzle bushing, as exemplified by means of the muzzle bushing 60, if the muzzle bushing has a bore diameter within a range of bore diameters smaller than the diameter of an imaginary circular cylinder circumscribing the skirt portion 86 when the skirt portion 86 is unstressed but larger than the diameter of the cap portion 82. As shown in FIG. 17, the muzzle bushing 60 has a bore diameter approaching the smallest diameter of such range. Inner surfaces of the flanged or flared portions 90 of the skirt portion 86 tend to be elastically deformed in a scalloped pattern, as shown where FIG. 17 is broken away, by being pressed radially against the threaded portion 36 of the threaded stud 30. Opposite edges of the slots 88 tend to also be drawn together, as shown there as well, at the bottom edge of the guidance tip 80.

Figure 16:
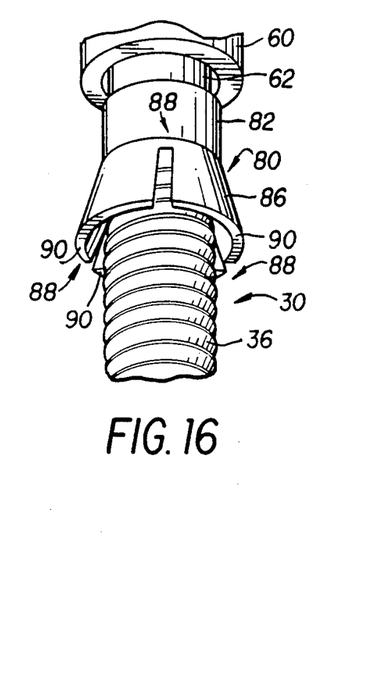
FIG. 16 is a fragmentary, perspective view showing the assemblage of FIG. 15 emerging from a muzzle bushing of a power-actuated tool.

As shown in FIG. 17, the assemblage made from the threaded stud 32, the guidance flute 10, and the guidance tip 80 is being driven from the muzzle bushing 60, by means of the driver 62, into a substrate 66 of concrete. The guidance tip 80 tends to remain upon the threaded stud 32, from which the guidance tip 80 can be easily removed with a pulling or twisting action. As shown in FIG. 16, the skirt portion 86 becomes flared again when the skirt portion 86 emerges from the muzzle bushing 60, whereby the skirt portion 86 cannot be accidentally drawn back fully into the muzzle bushing 60 when the driver 62 is retracted.

Figure 18:
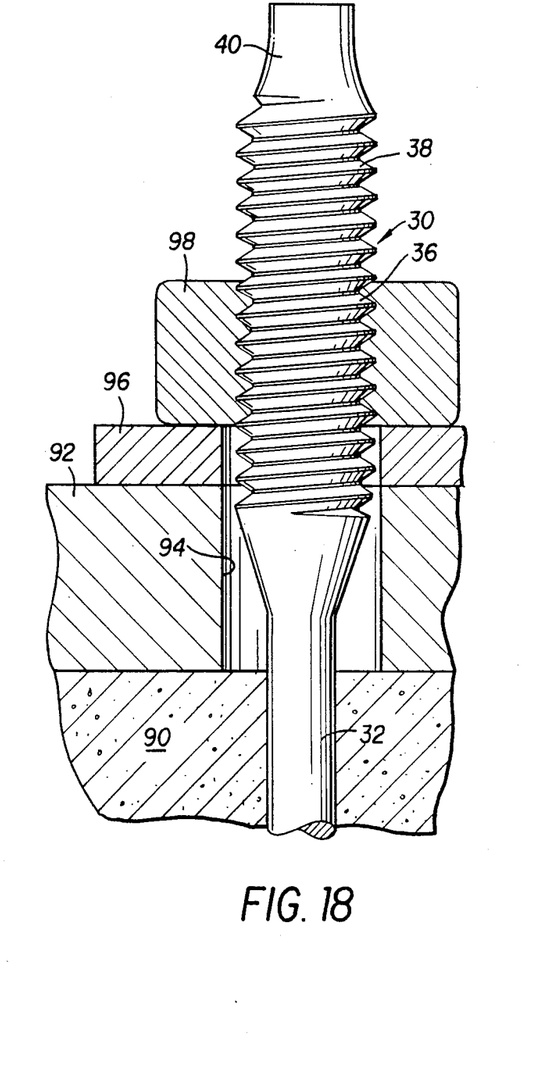
FIG. 18 is a similar view showing the threaded stud, as driven into the substrate, and showing a metal part, as bolted to the substrate by means of the threaded stud, an annular washer overlying the metal part, and a threaded nut overlying the annular washer and being threaded onto the threaded stud.

As shown in FIG. 18, the threaded stud 36 can be advantageously used to mount a metal part 92 having a suitable hole 94, through which the threaded stud 32 extends upwardly from the substrate 90 so as to expose the threaded portion 38 above the metal part 102. An annular washer 96, such, as, for example, a lock washer, is fitted around the threaded stud 36, over the metal part 92. A nut 98 is threaded onto the threaded portion 38 of the threaded stud 32, above the washer 96 so as to secure the metal part 92.

Various modifications may be made in the guidance flute and guidance tip described above without departing from the scope and spirit of this invention. It is therefore to be understood that within the scope of the appended claims, the present invention may be practiced otherwise than as specifically described herein.

We claim:

1. A guidance flute, used to retain a pointed fastener, within a muzzle bushing of a powder-actuated tool and to guide said fastener as said fastener is driven by means of said tool, said flute being made of elastomeric material and having a tubular body formed with a central bore, which defines a central axis of said tubular body and extends axially through said flute, and with integral ribs projecting outwardly from said tubular body in parallel pairs, with each rib being disposed substantially tangential to a circular locus defining said central bore and extending axially along said tubular body, said pair of ribs comprising a relatively short rib and a relatively long rib in a sense of outward projection of said ribs from said tubular body, as arrayed in at least three pairs, wherein said relatively long rib of such pair and said relatively short rib of such pair are disposed upon opposite sides of an imaginary diametrical plane through said central axis when all ribs of said flute are unstressed, such pairs being arrayed at regular circumferential intervals about said tubular body, said relatively long ribs being arranged to be elastically deformed so as to fit snugly within such a muzzle bushing with a bore diameter within a range of bore diameters smaller than the diameter of an imaginary circular cylinder circumscribing said relatively long ribs when said relatively long ribs are unstressed but not smaller than the diameter of an imaginary circular cylinder circumscribing said relatively short ribs when relatively short ribs are unstressed.

2. The flute of claim 1 wherein the relatively short and relatively long ribs of each pair are spaced equally from an imaginary diametrical plane through said central axis when all ribs of the flute are unstressed.

3. The flute of claim 2 wherein the relatively short rib of each pair and the relatively long rib of a diametrically opposed one of such pairs are disposed on a common side of an imaginary diametrical plane through the central axis.

4. The assemblage made from the guidance flute of claim 1 and a threaded shank having an unthreaded portion, which is formed with a pointed end, and having a threaded portion, which extends axially from the unthreaded portion, wherein the unthreaded portion extends axially through the central bore.

5. An assemblage made from the guidance flute of claim 1 and a drive pin having an elongate shank, which is formed with a pointed end, and having a head, which when viewed axially is circular, wherein the elongate shank is fitted snugly through the central bore.

6. The assemblage of claim 5 wherein the head has a diameter equal nearly to but not greater than the diameter of an imaginary circular cylinder circumscribing the relatively short ribs when the relatively short ribs are unstressed.

7. A guidance tip, as used with a threaded stud having an unthreaded portion which is formed with a pointed end, a threaded portion which extends axially from said unthreaded portion and which is formed with starting threads, and a blunt end, for protecting said starting threads and for guiding said threaded stud as said threaded stud is driven through a muzzle bushing of a powder-actuated tool, said guidance tip having a cap portion, which is arranged to fit snugly around said blunt end, and skirt portion integral with said cap portion and which extends axially from said cap portion so as to be disposed about said starting threads, and which is slotted so as to be elastically deformable so as to fit snugly, said muzzle bushing having a bore diameter within a range of bore diameters smaller than the diameter of an imaginary circular cylinder circumscribing said skirt portion when said skirt portion is unstressed but larger than the diameter of said cap portion.

8. The guidance tip of claim 7, comprising, inn combination therewith:

a guidance flute, as used to retain said threaded stud within said muzzle bushing and to guide said threaded stud through said muzzle bushing as said threaded stud is driven by means of said tool cooperating with said muzzle bushing, said flute being made of elastomeric material and having a tubular body formed with a central bore defining a central axis within said tubular body and extending axially through said flute and with integral ribs projecting outwardly but not radially from said tubular body and extending axially along said tubular body, said ribs comprising relatively short ribs and relatively long ribs in a sense of outward projection of said ribs from said tubular body, as arrayed in at least three pairs, each pair of said ribs consisting of one relatively short rib and one relatively long rib in parallel relation to each other with said relatively long rib of each pair and said relatively short rib of each pair being disposed upon opposite sides of an imaginary diametrical plane through said central axis of said flute when all of said ribs of said flute are unstressed, said pairs being arrayed at regular circumferential intervals about said tubular body, said relatively long ribs being arranged so as to be elastically deformed so as to fit snugly, said muzzle bushing having a bore diameter which is within a range of bore diameters smaller than the diameter of an imaginary circular cylinder circumscribing said relatively long ribs when said relatively long ribs are unstressed but not smaller than the diameter of an imaginary circular cylinder circumscribing said relatively short ribs when said relatively short ribs are unstressed.

9. The combination as set forth in claim 8, wherein: said at least three pairs of ribs comprises four pairs of circumferentially equally spaced ribs.

10. A guidance tip as set forth in claim 7, wherein: said blunt end of said threaded stud is disposed upon an end of said threaded stud which is opposite the end upon which said unthreaded portion and said pointed end are disposed.

11. A guidance flute, used to retain a pointed fastener, within a muzzle bushing of a powder-actuated tool, and to guide said fastener as said fastener is driven by means of said tool, said flute being made of elastomeric material and having a tubular body formed with a central bore, which defines a central axis of said tubular body which extends axially through said flute, and with integral ribs projecting outwardly, but not radially, from said tubular body and extending axially along said tubular body, said ribs being disposed in four pairs disposed at equally spaced circumferential positions about said tubular body, each pair consisting of one relatively short rib and one relatively long rib disposed parallel to each other and upon opposite sides of a first imaginary diametrical plane passing through said central axis of said tubular body, and wherein each short rib and each long rib of each pair of ribs of a diametrically opposed pair of said ribs upon opposite sides of a second imaginary diametrical plane, passing through said central axis of said tubular body, which is disposed substantially perpendicular to said first imaginary diametrical plane, when all of said ribs of said flute are unstressed; and wherein further, said relatively long ribs are arranged so as to be elastically deformed so as to fit snugly into said muzzle busing when said muzzle bushing has a bore diameter which is within a range of bore diameters smaller than the diameter of an imaginary circular cylinder circumscribing said relatively long ribs when said relatively long ribs are unstressed but not smaller than the diameter of an imaginary circular cylinder circumscribing said relatively short ribs when said relatively short ribs are unstressed.

12. The guidance flute of claim 11 wherein the relatively short and relatively long ribs of each pair are spaced equally from said first imaginary diametrical plane through the central axis of the flute when all ribs of the flute are unstressed.

13. The flute of claim 12 wherein the relatively short rib of each pair and the relatively long rib of a diametrically opposed one of such pairs are disposed on a common side of an imaginary diametrical plane through the central axis.

14. The flute of claim 13 wherein the relatively long ribs of respective pairs in diametrically opposed relation to each other are adapted to bear against an inner cylindrical wall of such a muzzle bushing at diametrically opposed locations on said wall.

15. A guidance tip, as used with a threaded stud having an unthreaded portion which is formed with appointed end, a thread portion which extends axially from said unthreaded portion and which is formed with starting threads, and a blunt end, for protecting said starting threads of said threaded stud and for guiding said threaded stud as said threaded stud is driven through a muzzle bushing of a powder-actuated tool, said guidance tip having a cap portion, which is arranged to fit snugly around said blunt end of said threaded stud, and a skirt portion which extends axially from said cap portion and which is flared and has a plurality of slots dividing said skirt portion into a plurality of slotted portions so as to render maid skirt portion elastically deformable so as to fit snugly within said muzzle bushing having a bore diameter which is within a range of bore diameters smaller than the diameter of an imaginary circular cylinder circumscribing said skirt portion when said skirt portion is unstressed but larger than the diameter of said cap portion.

16. The guidance tip of claim 15 wherein said slots extend toward the cap portion so as to divide the skirt portion into plural flanges arranged to be so deformed.

17. The guidance tip of claim 16 having three such slots arranged at regular circumferential intervals about the skirt portion.

18. A guidance tip as set forth in claim 15, wherein:
said blunt end of said threaded stud is disposed upon an end of said threaded stud which is opposite the end upon which said unthreaded portion and said pointed end are disposed.

19. The guidance tip as set forth in claim 15, wherein:
said skirt portion comprises three equiangularly, circumferentially spaced slots dividing said skirt portion into three slotted portions.

* * * * *